US008594322B2

(12) United States Patent
Bertoni et al.

(10) Patent No.: US 8,594,322 B2
(45) Date of Patent: Nov. 26, 2013

(54) ENCODING/DECODING APPARATUS

(75) Inventors: Guido Marco Bertoni, Carnate (IT); Jefferson Eugene Owen, Fremont, CA (US)

(73) Assignee: STMicroelectronics S.r.l., Agrate Brianza (IT)

( * ) Notice: Subject to any disclaimer, the term of this patent is extended or adjusted under 35 U.S.C. 154(b) by 1216 days.

(21) Appl. No.: 11/775,749

(22) Filed: Jul. 10, 2007

(65) Prior Publication Data

US 2009/0016525 A1 Jan. 15, 2009

(51) Int. Cl.
*H04L 9/06* (2006.01)
*H04L 9/28* (2006.01)

(52) U.S. Cl.
USPC ............... 380/37; 380/28; 380/255; 713/189; 713/192

(58) Field of Classification Search
USPC ............... 380/28, 37, 200, 255; 713/189, 192
See application file for complete search history.

(56) References Cited

U.S. PATENT DOCUMENTS 5,631,960 A * 5/1997 Likens et al. .................... 380/2
6,324,286 B1 * 11/2001 Lai et al. ......................... 380/29
6,434,699 B1 * 8/2002 Jones et al. .................. 713/168
6,760,439 B1 * 7/2004 Windirsch ...................... 380/37
6,831,979 B2 * 12/2004 Callum .......................... 380/28
6,957,340 B1 * 10/2005 Pang et al. .................... 713/189
7,263,186 B2 * 8/2007 Chang et al. .................... 380/37
7,570,760 B1 * 8/2009 Olson et al. ..................... 380/37
7,600,131 B1 * 10/2009 Krishna et al. ................ 713/192
2003/0140241 A1 * 7/2003 England et al. ............... 713/194
2004/0047466 A1 * 3/2004 Feldman et al. ................ 380/37
2004/0111626 A1 * 6/2004 Livny ........................... 713/189
2005/0147239 A1 * 7/2005 Chin et al. ...................... 380/28
2005/0276413 A1 * 12/2005 Neogi ............................ 380/28
2006/0056620 A1 * 3/2006 Shingal et al. .................. 380/28
2007/0177718 A1 * 8/2007 Shimosato et al. ............. 380/28
2007/0192571 A1 * 8/2007 Feghali et al. ................ 712/220

* cited by examiner

*Primary Examiner* — Yin-Chen Shaw
(74) *Attorney, Agent, or Firm* — Seed IP Law Group PLLC

(57) ABSTRACT

An encoding/decoding apparatus comprises a central processing unit and an encryption/decryption accelerator coupled to the central processing unit. The accelerator comprises an input for input data to be encrypted/decrypted, an arithmetic logic unit coupled to said input for performing selectable operations on data obtained from said input data and an output for encrypted/decrypted data coupled to said arithmetic logic unit.

24 Claims, 5 Drawing Sheets

ENCODING/DECODING APPARATUS

BACKGROUND

1. Technical Field

The present invention relates to an encoding/decoding apparatus including an electronic device for accelerating encryption/decryption of digital data.

2. Description of the Related Art

Nowadays, as consequence of the increasing development in wireless communications, security and privacy of data transmission are great targets.

In fact, common used electronic equipments, such as smart cards, set-top boxes for digital television, mobile phones, PDA's are usually equipped with dedicated electronic blocks devoted to encrypt/decrypt digital messages and data which are transmitted or received by such equipments.

The electronic blocks are hardware devices integrated on a chip and called hardware accelerators by those skilled in the art.

In order to ensure a secure transmission of data and messages, the above indicated electronic blocks implement known encryption/decryption algorithms or block ciphers. For example, the most used block ciphers are the DES (Data Encryption Standard) and AES (Advanced Encryption Standard) algorithms. Particularly, as known by those skilled in the art, the AES algorithm implements Rijndael encoding and decoding in accordance with a standard proposed by the US National Institute of Standard and Technology (NIST).

Moreover, a AES block cipher can operate on blocks of data having a fixed length of 128 bits and is programmable for 128, 192 or 256 bit key lengths.

Because a message may be of any length, several modes of operation have been developed to allow block ciphers to guarantee confidentiality for messages having arbitrary length. Exemplary modes of operation are: the Electronic Codebook (ECB), the Cipher-Block Chaining (CBC), the Cipher Feedback (CFB), the Output Feedback (OFB), the Counter Mode (CTR) all that give privacy; the Cipher Block Chaining Message Authentication Code (CBC-MAC) mode which gives data integrity; the Counter with CBC-MAC (CCM) for achieving both data integrity and privacy.

For example, an encryption operation performed on a message according to the Counter Mode can be described with reference to FIG. 6. Particularly, in such FIG. 6, P1, P2, P3 and P4 indicate the input blocks of data composing the message to be encrypted. The Counter Mode employs AES block ciphers Ek and employs an Initialization Vector IV to kick off the operation. It should be observed that all AES block ciphers Ek encrypt data by employing the same key k.

The Counter Mode operates as follows: the vector IV, also named counter, is firstly encrypted by the first AES block; the result of such encryption is then put in XOR with the first input block P1 in order to produce the first encrypted block C1. Subsequently, vector IV is incremented and then encrypted by a further AES block Ek. The result of this further encryption is put in XOR with the second input block P2 in order to produce the second encrypted block C2. The same process is repeated up to the end of all the blocks composing the message.

Analogously, with reference to FIG. 7, an exemplary encryption operation performed on a message according to the CBC mode can be described. Particularly, P1, P2, P3 and P4 indicate the input blocks of data composing the message to be encrypted. The CBC Mode employs the AES block ciphers Ek and requires the Initialization Vector IV to kick off the operation.

The CBC Mode operates as follows: the first block of data P1 is put in XOR with the Initialization Vector IV; then the result of such operation is encrypted by the first AES block Ek; the result of such first encryption operation corresponds to the first encrypted block C1. Subsequently, the second block of data P2 is put in XOR with the produced first encrypted block C1; the result of such second XOR operation is then encrypted by a further AES block Ek in order to produce the second encrypted block C2. The same process is repeated up to the end of all the blocks composing the message to be encrypted.

Actually, hardware accelerators included, for example, in a digital decoder or in a mobile phone, are designed and manufactured to implement a limited number of standard modes of operation, as CBC mode and Counter Mode. In other words, such accelerators can not work implementing a mode of operation which is different from the prefixed ones.

Anyway, new modes of operation are proposed time after time for increasing security of encryption/decryption operations.

As consequence, each encryption/decryption operation based on a new mode must be executed (by software) by a main processor CPU (Central Processing Unit) provided in the digital decoder or in the mobile phone. This results in a reduction of the benefit of having the encryption/decryption operations managed by a separate hardware block.

BRIEF SUMMARY

One embodiment of the present invention relates to an encoding/decoding apparatus, comprising: a central processing unit; an encryption/decryption accelerator coupled to the central processing unit and comprising: an input for input data to be encrypted/decrypted; an arithmetic logic unit coupled to said input for performing selectable operations on data obtained from said input data; an output for encrypted/decrypted data coupled to said arithmetic logic unit.

Another embodiment of the present invention relates to an encrypting/decrypting accelerator comprising: an input for input data to be encrypted/decrypted; at least one arithmetic logic unit for performing selectable operations on data obtained from said input data; a logic circuit coupling the input and the arithmetic logic unit defining an encryption/decryption path for said input data; an output for encrypted/decrypted data coupled to said logic circuit.

Further embodiments of the invention are described in the dependent claims.

BRIEF DESCRIPTION OF THE DRAWINGS

The characteristics and the advantages of the present invention will be better understood from the following detailed description of one embodiment thereof, which is given by way of illustrative and non-limiting example with reference to the annexed drawings, in which.

DETAILED DESCRIPTIONS

Figure 1:
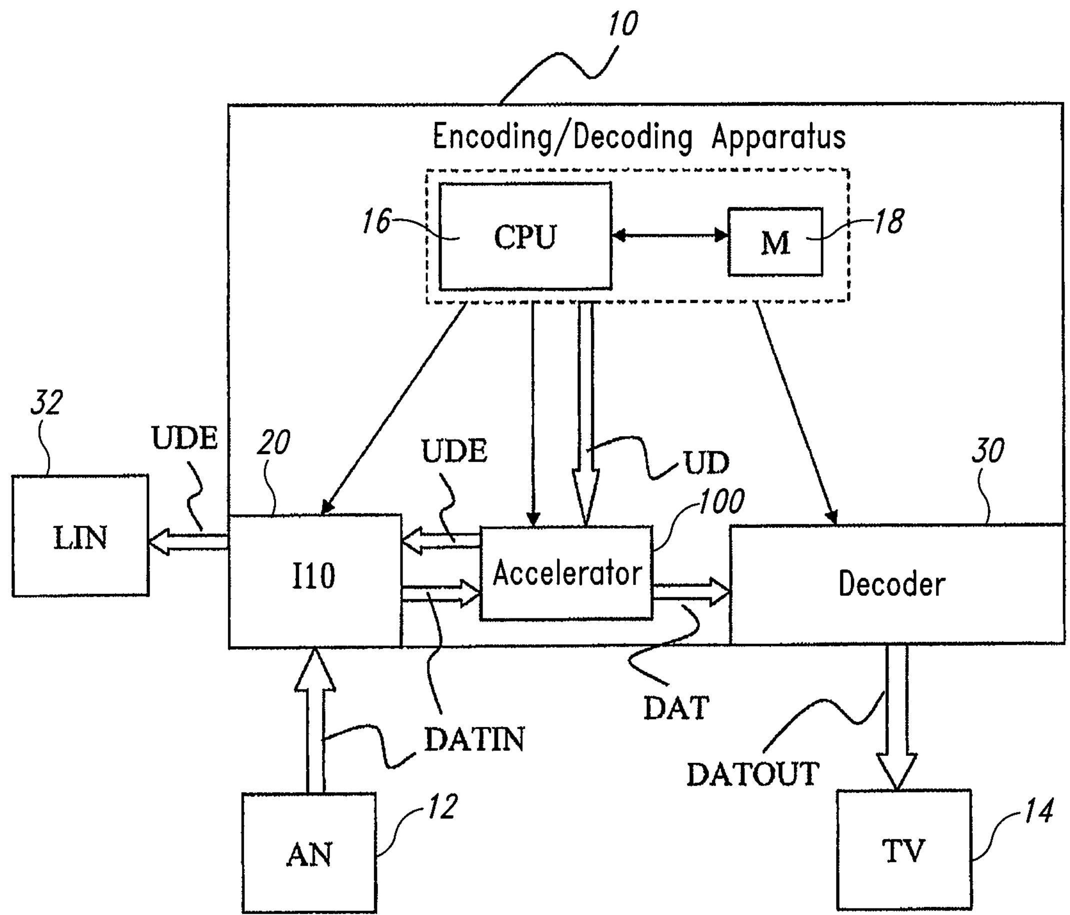
FIG. 1 shows schematically one embodiment of a digital encoding/decoding apparatus in accordance with the invention.

One embodiment of an encoding/decoding apparatus 10 for digital data in accordance with the invention can be described with reference to FIG. 1. For example, such an encoding/decoding apparatus 10 is a set-top-box for digital television which is suitable to receive an encoded input data stream DATIN (audio and/or video data) from an external antenna (AN) 12 in order to provide the corresponding decoded data stream DATOUT to a television set (TV) 14 which is connected to the encoding/decoding apparatus 10.

In more detail, the encoding/decoding apparatus 10 comprises a central processing unit (CPU) 16, i.e., a microprocessor or a microcontroller, connected to a main memory (M) 18. Furthermore, the apparatus 10 comprises an input/output device 20 controlled by the CPU in order to receive the encoded input data stream DATIN.

In addition, the apparatus 10 comprises an electronic device 100 devoted to encrypt/decrypt digital data. In more detail, such electronic device 100 is a hardware accelerator operating under the control of the CPU in order to decrypt the data stream DATIN received by the input/output circuit 20. Particularly, the hardware accelerator 100 receives activation signals from the CPU to decrypt the data stream DATIN and to send decrypted data DAT to a video/audio decoder 30 which provides (under the control of CPU) the decoded data stream DATOUT to the external TV 14.

It should be observed that the apparatus 10 can also allow the interaction of a user with a digital television broadcasting provider. For example, whether the user wants to select a television program his user data UD related to a digital television subscription have to be sent to the provider. Usually, such user data UD are stored in the main memory M of the apparatus 10. Alternatively, user data UD are stored in an auxiliary transportable memory (not shown in FIG. 1) interfaced with the central unit CPU. In this case, the hardware accelerator 100 is suitable to receive the user data UD from the central unit CPU and to encrypt them.

Then, encrypted user data UDE are provided to the input/output circuit 20 to be sent to the television provider by employing an external line (LIN) 32 (for example, a telephone line) connected to the encoding/decoding apparatus 10.

It should be observed that the encoding/decoding apparatus 10 in accordance with the invention comprises a clock generator (not shown in FIG. 1) suitable to provide clock signals to control operations performed by each digital device (for example, the hardware accelerator 100) included in the apparatus 10 as known by those skilled in the art.

Other than in set top boxes, the hardware accelerator 100 above indicated can be included in many electronic equipments, such as smart cards, mobile phones, PDA's.

Figure 2:
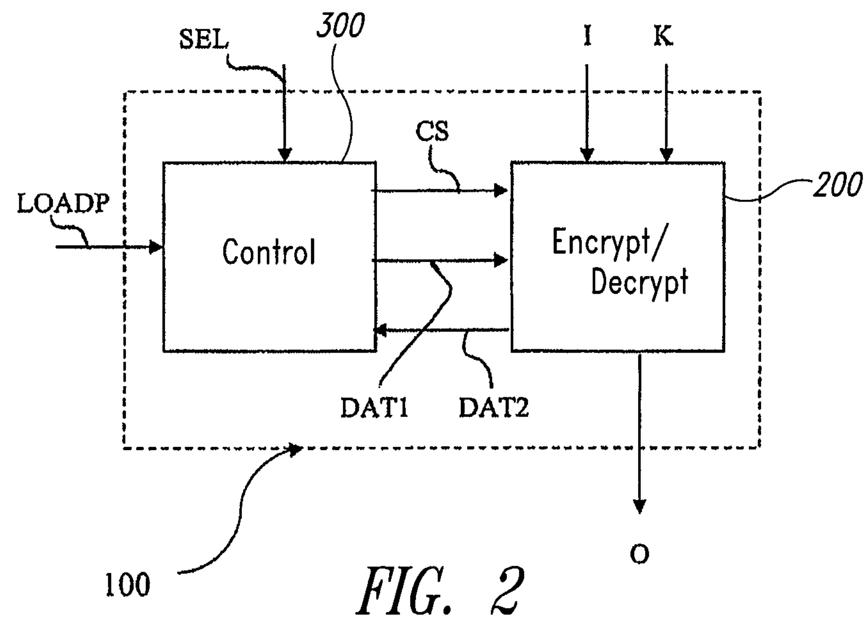
FIG. 2 shows a block diagram of an electronic encryption/decryption hardware accelerator included in the apparatus of FIG. 1.

A preferred embodiment of the encryption/decryption hardware accelerator 100 included in the encoding/decoding apparatus 10 can be described with reference to FIG. 2.

For example, the hardware accelerator 100 implements, for example, a AES encryption/decryption standard algorithm but it can also implement other block ciphers, such as DES.

The accelerator 100 comprises a first electronic block or data path block 200 which interfaces a second electronic block or control block 300. In more detail, the first block 200 has a first input to receive a flow of data I to be encrypted/decrypted and a second input to receive a key K to encrypt or decrypt such data I. An output of the same first block 200 provides a flow of data encrypted or decrypted O. Moreover, the first block 200 comprises terminals to exchange a first DAT1 and a second DAT2 groups of data with the second electronic block 300.

Furthermore, the data path block 200 has a first terminal to receive control signals CS from the control block 300. Both the groups of data DAT1, DAT2 and the control signals CS will be described in more detail in the following.

Such second block 300 is suitable to control the flow of the input data I in order to perform a plurality of modes of operations in the data path block 200. Such modes of operation are, for example, the CBC mode, the OFB mode, the Counter Mode, etc.

In more detail, the control block 300 can store one or more computer programs each indicative of a standard mode of operation, such as CBC mode and Counter Mode. Such modes of operation are usually loaded in the hardware accelerator 100 when the same is manufactured.

After the encoding/decoding apparatus 10 has been equipped with the accelerator 100 and once the same has been put into operation, the control block 300 is suitable to receive further computer programs indicative of new and upgraded modes of operations such as, for example, CBC-MAC and CCM modes.

In this case, the control block 300 has a further first input to receive a load signal LOADP containing instructions related to such new modes that have to be stored in a suitable memory included in the control block 300. In this way, in addition to the standard modes of operation, the hardware accelerator 100 can operate according to such new modes for ensuring a more secure encryption/decryption of the digital data I.

For example, the further computer programs can be provided from outside the apparatus 10, in the form of wireless signals received by the antenna 12.

Moreover, the control block 300 has a further second input to receive selection signals SEL to select one mode of operation among the others. For example, such selection signals SEL are provided by the central processing unit 16 included in the apparatus 10.

A first embodiment of the data path block 200 of the accelerator 100 can be described with reference to FIG. 3.

Particularly, the data path block 200 is a logic circuit defining encryption/decryption paths for the above indicated input data I.

In more detail, the data path block 200 comprises a AES block cipher which is able to encrypt/decrypt for example a 128-bit data block for a clock cycle.

Figure 3:
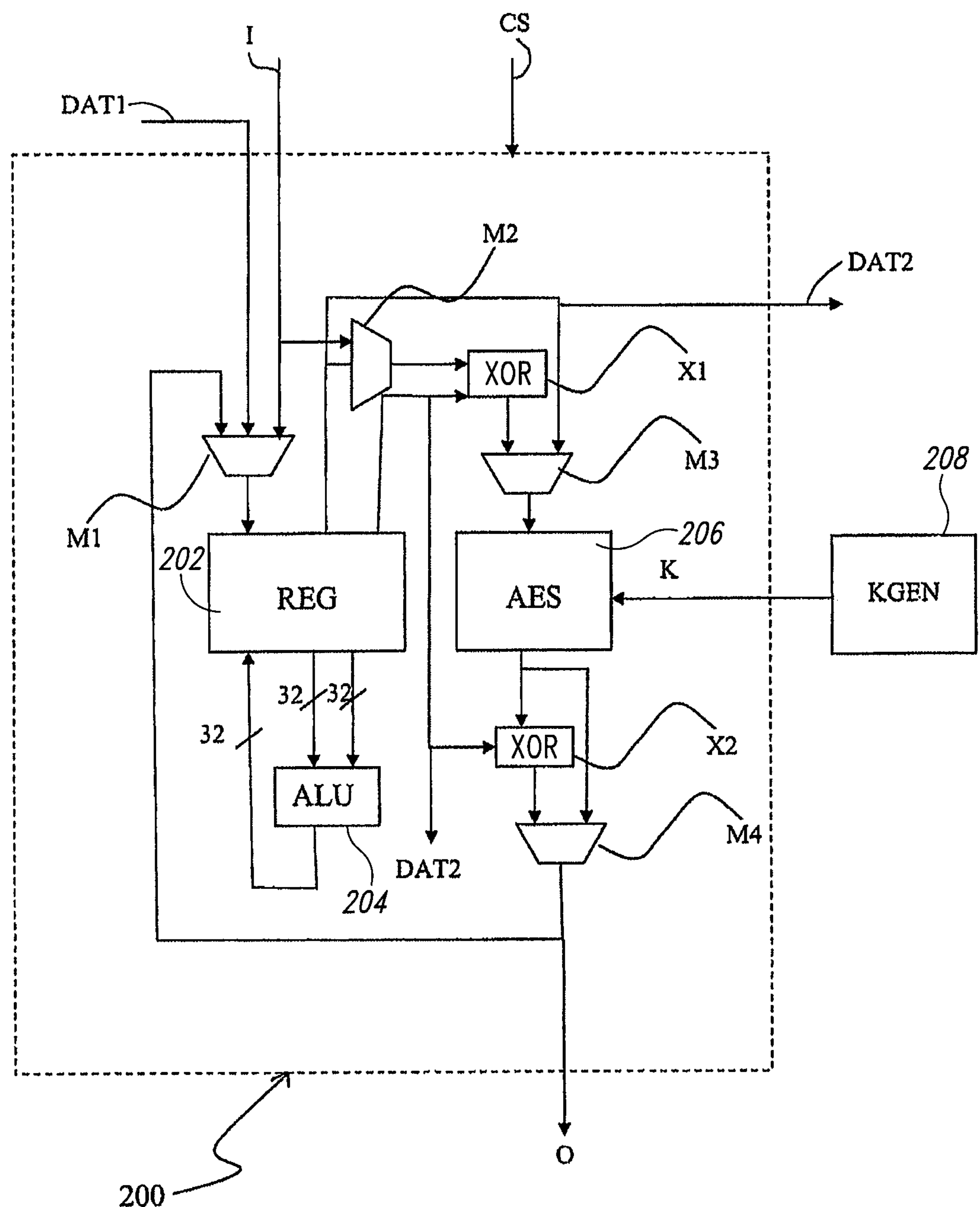
FIG. 3 is a block diagram representing a first embodiment of an exemplary first electronic block of the accelerator of FIG. 2.

It should be assumed that each line shown in the data path block 200 of FIG. 3 is an electrical line for data which is suitable to carry 128 bits. Electrical lines carrying a lesser number of bits (for example, 32 bits) are clearly marked in FIG. 3 with a number indicating the carried bits. For example, the electrical lines carrying 128 bits can be realized by employing four 32-bit electrical buses.

Moreover, the data path block 200 comprises a register bank (REG) 202 which includes a set of registers, for example 16 registers each one of 32 bits. During a reading operation of the same register bank 202, such register is suitable to provide two values (each one of 32 bits) per clock cycle. On the contrary, only one value of 32 bits can be written in the register bank 202 per clock cycle.

In addition, the data path block 200 comprises a sub-block suitable to manipulate 32 bit words. Particularly, such sub-block comprises an arithmetic logic unit (ALU) 204 which is able to execute arithmetic and logic operations on one or two 32-bit input words received from the register bank REG. For example, the ALU can perform the following operations: logical operations as AND, OR, NOT and XOR of the received two input words, the arithmetic addition (subtraction) of such two input words, the increment of one of these inputs, the shift left or right of one input word. It should be observed that in case of unary operations performed only on a 32-bit input word, the second word received by ALU is not considered.

Moreover, such data path block 200 can include more than one ALU operating on 32-bit words or one ALU operating on 64-bit words. It should be observed that the number of ALU included in the data path block 200 and their properties depend on the clock cycles to process one input data I (e.g., 128 bits) by the AES encryption/decryption algorithm.

It should be observed that the first group of data DAT1 provided by the control part 300 are usually reference data to be used for starting the encryption/decryption operations according to different modes. For example, such first data DAT1 can correspond to an Initialization Vector (IV) of the Counter Mode that is known by those skilled in the art.

On the contrary, the second group of data DAT2 usually correspond to data generated and elaborated in the data path block 200. The second group of data DAT2 are furnished to the control block 300 in order to allow this block 300 to control the correctness of the performed encryption/decryption operations.

The data path block 200 comprises a first multiplexer M1 having three inputs and one output. Such first multiplexer M1 is suitable to receive in input the flow of data I (128 bits) to be encrypted/decrypted, the first group of data DAT1 provided by the control block 300 and a feedback signal including the encrypted/decrypted output data O generated by the same data block 200. The single output of the first multiplexer M1 is sent to the register bank REG in order store in the same bank REG, selectively, the input data I, the first data DAT1 or the output data O.

A second multiplexer M2 is included in the data path block 200. Such second multiplexer M2 has a first input to receive the flow of input data I and a second input to receive the second group of data DAT2 provided by the register bank REG. The output of such second multiplexer M2 is sent to a first XOR block X1 in order to perform a XOR operation among the same output of the second multiplexer M2 and the second group of data DAT2 to be provided to the control block 300.

Furthermore, the data path block 200 comprises a third multiplexer M3 having two inputs and one output. Such third multiplexer M3 is suitable to receive in input both the result of the operation performed in the first XOR block X1 and the second group of data DAT2. Data selected by third multiplexer M3 are sent to the AES block cipher 206 in order to be encrypted/decrypted.

Data encrypted/decrypted by AES are then provided both to a second XOR block X2 and to a fourth multiplexer M4. It should be observed that such second XOR block X2 receives also the second group of data DAT2 provided by the register bank REG as further input. The output of the second XOR block X2 corresponds to a second input of the fourth multiplexer M4. An output of such fourth multiplexer M4 corresponds to the output data O of the block 200.

It should be observed that a plurality of signals must be provided to the data path block 200 for driving the multiplexers M1, M2, M3, M4, for selecting the locations of the register bank REG to be read or written and for selecting the logical operations to be performed by ALU. In FIG. 3, all these signals are included in the control signals CS provided by the control block 300 to a first terminal of the data path block 200.

Particularly, each mode of operation corresponds to a group of control signals CS which differs from the group of control signals of another mode. Further, different groups of control signals CS define different encryption/decryption paths in the data path block 200.

Moreover, the key K used by the AES block cipher 206 during encryption/decryption operations is generally provided by an external key generator block (KGEN) 208. For example, the key length may be 128, 192 or 256 bits.

Figure 4:
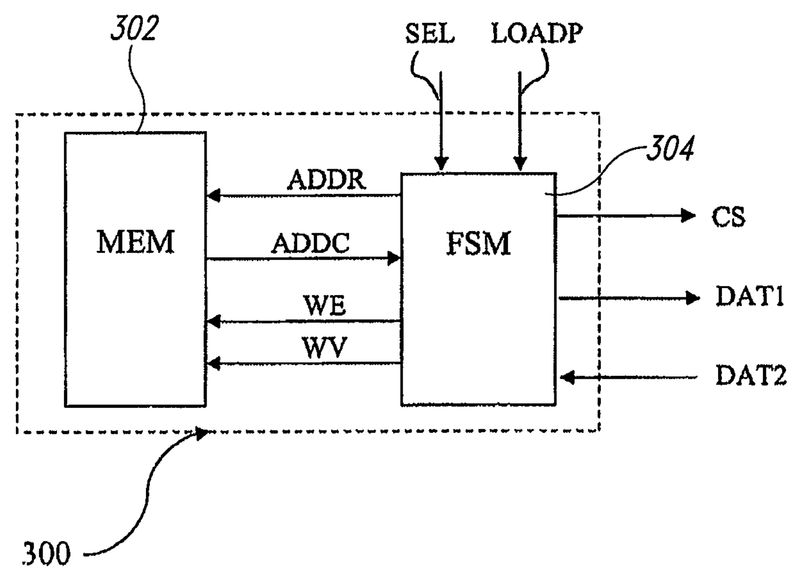
FIG. 4 is a block diagram representing a preferred embodiment of a second electronic block included in the accelerator of FIG. 2.

A preferred embodiment of the control block 300 included in the hardware accelerator 100 can be schematically described with reference to FIG. 4.

Particularly, such control block 300 comprises a further memory (MEM) 302 which interfaces a finite state machine (FSM) 304.

The memory MEM is suitable to store one or more computer programs each indicative of a standard mode of operation, such as CBC mode and Counter Mode. Particularly, such standard modes are usually loaded in the memory MEM during the manufacture step of the hardware accelerator 100 in accordance with the invention. In addition, the same memory MEM is suitable to store the further computer programs relative to new and upgraded modes of operation, such as CBC-MAC and CCM that are received from outside the accelerator 100.

The above indicated computer programs stored in the memory MEM usually comprise instructions including words composed by a fixed number of bits. For example, a word read from the memory MEM comprises: the values of the signals to be provided in order to activate the multiplexers M1, M2, M3, M4 of the data path block 200; the addresses of the locations in the register bank REG to be read or written; execution commands indicating when to jump from an instruction to a previous one or to a next one.

The memory MEM of the control block 300 usually comprises both a ROM (Read Only Memory) memory and a RAM (Random Access Memory) memory. In this case, the standard modes of operation can be stored in the ROM memory.

The finite state machine FSM is a digital circuit known to those skilled in the art. This machine FSM operates for receiving the selection signals SEL indicating which computer program, i.e., which mode of operation, stored in the memory MEM has to be executed. Such selection signals SEL comprise, for example: a request to execute one program, i.e., a mode of operation (1 bit) and the number of the program to be executed (n bit).

In addition, during a programming step of the hardware accelerator 100, the machine FSM is suitable to receive the load signal LOADP. In more detail, such load signal LOADP carries information and instructions related to the mode to be stored in the memory MEM. For example, the above indicated information can be: an instruction to load a word related to a new mode (1 bit), a memory address where the received word has to be stored (m bit) and a word value (k bit), i.e., the instruction itself.

Furthermore, the finite state machine FSM is connected to the memory MEM by a plurality of electrical lines. In this way, such finite state machine FSM is suitable to send to the memory MEM a write enable signal WE in order to store the received word value into a location of memory MEM. The machine FSM is also suitable to send to the memory MEM a write value signal WV carrying the word to be stored.

In addition, once the control block 300 is put into operation, the machine FSM is suitable to send address signals ADDR to the memory MEM in order to select the memory locations where the instructions related to different modes of operation are stored. In reply to each address signal ADDR, the machine FSM can receive a replay signal ADDC indicating the content of the selected memory locations.

In accordance with the instructions received from the memory MEM, the same machine FSM is suitable to provide the control signals CS to the first terminal of the data path block 200 and to exchange the first DAT1 and the second DAT2 groups of data with such block 200.

Figure 5:
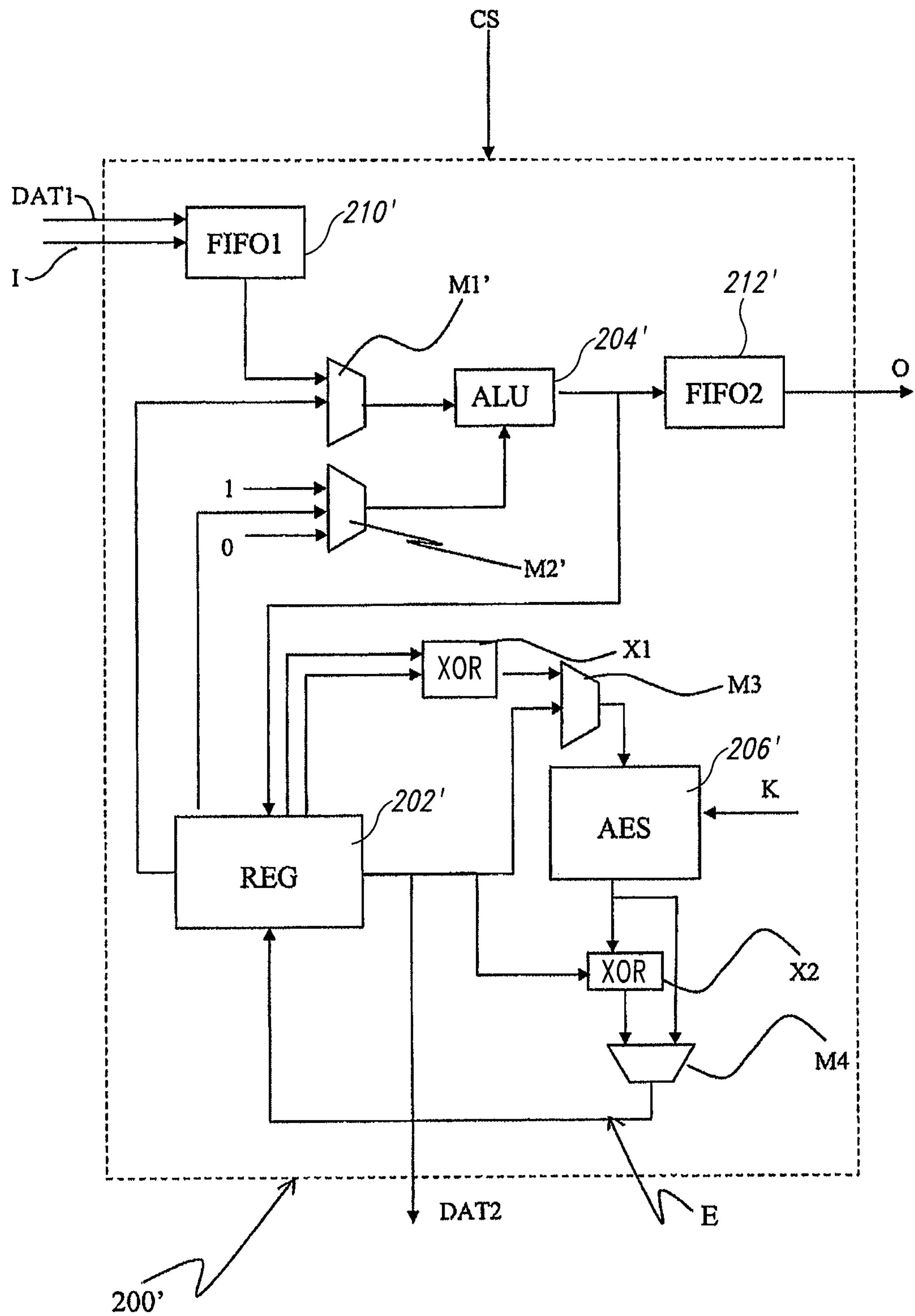
FIG. 5 is a block diagram representing a second embodiment of an exemplary first electronic block included in the accelerator of FIG. 2.
Figure 6:
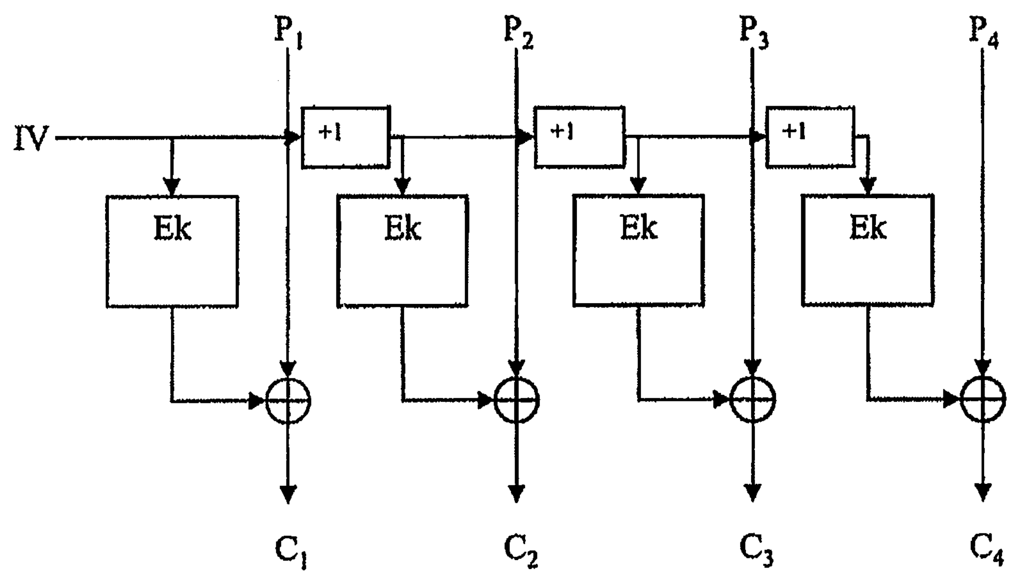
FIG. 6 shows schematically an operation of encryption performed on block of a message according to a Counter Mode.
Figure 7:
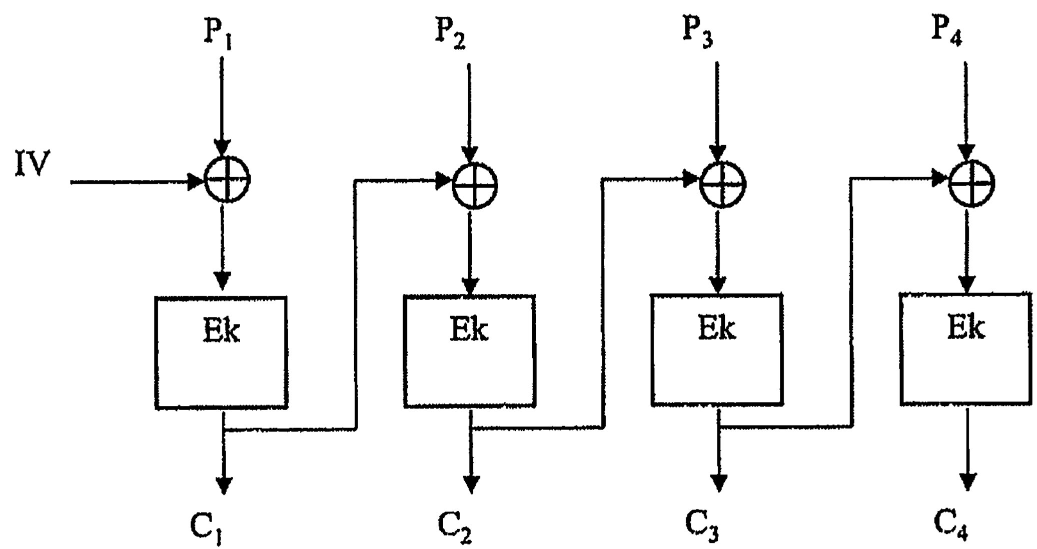
FIG. 7 shows schematically an operation of encryption performed on blocks of a message according to a CBC Mode.

With reference to FIG. 5, a data path block 200' of a second embodiment of the invention can be described.

It should be observed that such data path block 200' includes: the block cipher (AES) 206', the register bank (REG) 202', the ALU 204', the first X1 and second X2 XOR blocks, the third M3 and fourth M4 multiplexers. Such circuit blocks are analogous to the ones described with reference to FIG. 3.

In addition, the data path block 200' comprises a first auxiliary block (FIFO1) 210' having two inputs to receive from the control block 300 both the input data I and the first group of data DAT1. Particularly, such first auxiliary block FIFO1 acts as a buffer for input data I having length greater that 128 bits. In this way, only 128 bit-blocks are processed for each clock cycle.

The data path block 200' also comprises a further first multiplexer M1' having two inputs and one output. Such further first multiplexer M1' has a respective first input connected to an output of the auxiliary block FIFO1 in order to receive the input data I (128 bits) to be encrypted/decrypted or, alternatively, the first group of data DAT1. On the contrary, the second input of the further first multiplexer M1' is connected to the register bank 202'.

Input data I exiting from the single output of the further first multiplexer M1' are sent to the ALU 204'. Then, such data I are sent to the register bank 202' in order to be stored therein.

A further second multiplexer M2' included in the data path block 200' has a first input to receive data stored in the register bank 202' that have to be processed by ALU 204'. Moreover, the further second multiplexer M2' also comprises two further inputs to selectively provide constant values to the ALU 204', for example, 0 and 1.

It should be observed that encrypted/decrypted data E which exit from the fourth multiplexer M4 are firstly stored in the register bank 202'. Then, such data E are sent to the second input of the further first multiplexer M1' to be transferred to the ALU.

Finally, the data path block 200' comprises a second auxiliary block (FIFO2) 212' which is analogous to the first one. Such second auxiliary block FIFO2 is suitable to receive the encrypted/decrypted data E that exit from the ALU in order to generate the encrypted/decrypted output data O.

In the following an example of encryption operation performed by the hardware accelerator 100 will be described with reference to FIGS. 3 and 4. Particularly, such encryption operation is performed on the flow of input data I according to the Counter Mode.

In order to start the encryption operation, the finite state machine FSM of the control block 300 receives the selection signals SEL from the central unit CPU of the encoding/decoding apparatus 10. As indicated above, such selection signals SEL can include the request to execute a computer program stored in the memory MEM and the number of the program corresponding to Counter Mode.

Then, the same machine FSM selects by the address signals ADDR the locations of the memory MEM where the requested computer program is stored. Consequently, the machine FSM receives signals ADDC from the memory MEM, i.e., the program instructions contained in the selected locations, and converts them both into the control signals CS and into the first group of data DAT1 to be supplied to the first terminal of data path block 200.

Particularly, for the Counter Mode operation the first group of data DAT1 correspond to the Initialization Vector IV.

In the following, it will be assumed that the flow of input data I could be divided into a plurality of input blocks of data, for example, four input blocks P1, P2, P3 and P4 each comprising 128 bits.

Firstly, the Vector IV is sent to the register bank REG of the data path block 200 through the first multiplexer M1. In more detail, the input of the first multiplexer M1 corresponding to the first group of data DAT1 is selected by a first control signal included in the control signals CS. In this way, the Vector IV can be loaded in a suitable location of the register bank REG, for example in the location reg0 selected by another control signal.

Then, a first block P1 of the input data I is sent to the register bank REG through the first multiplexer M1, i.e., by activating the corresponding input with a second control signal. In this way, such first input block P1 can be loaded in another location of the register bank REG, namely in reg1.

At this stage, after that the register bank REG has received a third control signal, the Initialization Vector IV previously stored in the location reg0 is sent to the AES block cipher to be encrypted with the key K. Particularly, Vector IV is sent directly to one input of the third multiplexer M3 and then to the AES block by enabling such input of M3 with a fourth control signal.

When the AES cipher block finishes encryption of the vector IV, the content of reg1, i.e., the first input block P1, is sent to the second XOR block X2. Such second block X2 executes a XOR operation between the first input block P1 and the Vector IV previously encrypted by AES. The result of the above operation which represents the encryption of the first input block P1 is then let available to the output O by enabling the corresponding input of the fourth multiplexer M4 by a fifth control signal.

It should be observed that once the Vector IV stored in reg0 has been submitted to the AES block for the first time, the register bank REG is idle up to the end of the first AES encryption step. Therefore, during such first step, it is possible to increase a value of Initialization Vector IV in order to prepare it for the second encryption step involving a second input block P2.

Particularly, the value of lower 32 bits of Vector IV stored in the location reg0 is sent to one of the inputs of ALU included in the data path block 200. The ALU receives a suitable control signal from the control block 300 to increment the value of such 32 bits of the Vector IV. Then, the result of the latter operation is re-memorized in reg0 of the register bank REG. In this way, the incremented Vector IV, indicated as IV', is ready for being submitted to the AES block for the second encryption step.

It should be observed that at the beginning of the second encryption step, the second input block P2 has to be stored in register bank REG. For example, such second block P2 can be stored in the same location reg1 overwriting the value of the previous first input block P1. In this case, only two registers of the bank REG are needed to perform the Counter Mode.

Alternatively, a plurality of registers, namely reg1, reg2, reg3 and reg4, included in the bank REG can be used to contemporary store all input blocks P1, P2, P3 and P4, respectively.

In the same way as described above, during the second encryption step, the incremented Vector IV' stored in reg0 is directly sent to one input of the third multiplexer M3 and then to the AES block cipher in order to be encrypted with the key K.

After encryption of Vector IV', the content of reg1, i.e., the second input block P2, is sent to the second XOR block X2. In this way, the second block X2 executes a XOR operation between the second input block P2 and the incremented Vector IV' previously encrypted by AES. The result such last operation represents the encryption of the second input block P2 and it is let available to the output O by enabling the corresponding input of the fourth multiplexer M4.

As described above, during the second encryption step, the value of Vector IV' can be increased again by ALU in order to prepare it for the following encryption step.

Encryption steps involving the third P3 and fourth P4 input blocks are performed in the same way as described with reference to the first P1 and second P2 input blocks.

Advantageously, the data path block 200 can execute a double operation in accordance with the Counter Mode, for example, a first decryption followed by an encryption. In this case the register bank REG can store two different Initialization Vectors IV in different locations. Particularly, each output block generated by AES after a first decryption operation is sent to a respective input of the first multiplexer M1 and then to the register bank REG by enabling such input of M1. Then, such decrypted block can be memorized in the same location of the bank REG previously occupied by the corresponding input block.

It should be observed that, in the same way as described above, the data path block 200 of FIG. 3 can perform encryption and decryption operations on the input data I in accordance with further modes, like CBC mode, CCM mode etc.

Analogously, the further data path block 200' described with reference to FIG. 5 can implement encryption/decryption operations according to Counter Mode, CBC mode, CCM, etc.

Advantageously, the data path blocks 200 and 200' employing the first X1 and the second X2 XOR blocks allow to reduce the processing time to encrypt/decrypt data, i.e., to reduce the number of clock cycles requested.

This can be achieved with a minimum semiconductor area overhead.

Alternatively, whether reduction of the silicon area occupied by the electronic device 100 is a great task, such first X1 and second X2 XOR blocks can be eliminated. In this case, particularly, the corresponding XOR operations have to be performed by the ALU.

In addition, the hardware accelerator 100 which couples the AES cipher block with a ALU and a memory MEM is advantageous in encryption/decryption of data with respect to the hardware accelerators known in the art.

In fact, all instructions and information related to different modes of operation employed in encryption/decryption of data are stored in the memory MEM of the control block 300. Advantageously, such memory MEM not only stores the standard mode of operation but it can be periodically upgraded by memorizing computer programs related to new modes of operation that ensure better security or include new features.

Particularly, new modes to encrypt/decrypt data can be uploaded in the memory MEM while the hardware accelerator 100 is operating inside the encoding/decoding apparatus 10.

In this way, advantageously, the central processing unit CPU provided in such apparatus 10 is not required to execute the computer program related to each new mode of operation when the above indicated new mode is not previously included in the hardware accelerator 100. In this way, a reduction of the power consumption of the central unit CPU is also obtained.

It should be observed that the hardware accelerator 100 can be utilized for a variety of encryption/decryption applications including: protection of network routers, electronic financial transactions, secure wireless communications, secure video surveillance systems, encrypted data storage.

While this detailed description has set forth some embodiments of the present invention, the appended claims cover other embodiments of the present invention which differ from the described embodiments according to various modifications and improvements.

The invention claimed is:

1. An encoding/decoding apparatus, comprising:

a central processing unit; and an encryption/decryption accelerator coupled to the central processing unit and directed by finite state machine logic, the encryption/decryption accelerator including:

an input for input data to be encrypted/decrypted;

an arithmetic logic unit coupled to said input for performing selectable operations on data obtained from said input data;

an output for encrypted/decrypted data coupled to said arithmetic logic unit;

a logic circuit coupling said input, said arithmetic logic unit, and said output, the logic circuit defining, through multiplexer circuitry, encryption/decryption paths for said input data, wherein the logic circuit includes a first terminal arranged to receive first command signals to select a first encryption/decryption path via the multiplexer circuitry and second command signals to select a second encryption/decryption path via the multiplexer circuitry; and a memory to store computer programs, each computer program representative of a corresponding encryption/decryption mode of operation, each computer program including instructions to select corresponding operations performed by the arithmetic logic unit, said memory configurable to periodically memorize a further computer program relating to a different mode of operation after the encryption/decryption accelerator is in operation, the further computer program receivable from outside the accelerator.

2. The apparatus of claim 1 wherein said logic circuit comprises a block cipher configured to execute an encryption/decryption algorithm on input data along said encryption/decryption path.

3. The apparatus of claim 1, wherein the first encryption/decryption path corresponds to a first mode of operation and the second encryption/decryption path corresponds to a different second mode of operation.

4. The apparatus of claim 1, wherein said computer programs further comprise instructions to generate said first and second command signals.

5. The apparatus of claim 1 wherein said logic circuit comprises:

at least a register bank for storing bit words obtained from said input data; and a least a multiplexer for selectively coupling a plurality of input lines to an output line.

6. The apparatus of claim 1, further comprising:

an input/output circuit controlled by the central processing unit for receiving from outside a first encrypted data stream to be provided to the accelerator and for receiving from the accelerator a second encrypted data stream to be provided to an external line; and a video/audio decoder for providing to outside a decrypted digital data stream received from the accelerator.

7. An encrypting/decrypting accelerator, comprising:

an input for input data to be encrypted/decrypted;

an output structured to output encrypted/decrypted data;

a finite state machine configured to direct operations of the encrypting/decrypting accelerator;

an arithmetic logic unit for performing selectable operations on data obtained from said input data;

a logic circuit coupling the input, the arithmetic logic unit, and the output, the logic circuit defining a plurality of encryption/decryption paths for said input data through multiplexer circuitry, wherein the logic circuit includes a first terminal arranged to receive first command signals to select a first encryption/decryption path through the multiplexer circuitry and second command signals to select a second encryption/decryption path through the multiplexer circuitry;

a memory to store at least two computer programs, each computer program representative of a corresponding encryption/decryption mode of operation, each computer program including instructions to select corresponding operations performed by the arithmetic logic unit, said memory configurable to store a further computer program relating to a different mode of operation, the further computer program receivable after the encrypting/decrypting accelerator is in operation.

8. The encrypting/decrypting accelerator of claim 7 wherein said logic circuit comprises:

a register bank for storing bit words obtained from said input data; and a multiplexer for selectively coupling a plurality of input lines to an output line.

9. The encrypting/decrypting accelerator of claim 8 wherein said logic circuit further comprises an XOR block in the encryption/decryption path for said input data.

10. The encrypting/decrypting accelerator of claim 8 wherein said logic circuit further comprises an Advanced Encryption Standard block cipher in the encryption/decryption path, said block cipher being selectable to encrypt/decrypt such data with a key generated by a key generator.

11. The encrypting/decrypting accelerator of claim 8 wherein said register bank includes 16 registers, each one of 32 bits, the register bank being suitable to provide two words, each one of 32 bits, per clock cycle during a reading operation.

12. The encrypting/decrypting accelerator of claim 11 wherein the arithmetic logic unit is able to execute arithmetic and logic operations on one or two 32-bit words received from the register bank.

13. The encrypting/decrypting accelerator of claim 7, further comprising:

a memory to store computer programs each representative of a corresponding encryption/decryption mode of operation, said memory being interfaced with the finite state machine.

14. The encrypting/decrypting accelerator of claim 13 wherein said memory includes both a read only memory and a random access memory.

15. The encrypting/decrypting accelerator of claim 13 wherein said finite state machine comprises a first input to receive selection signals each indicating an encryption/decryption mode of operation stored in the memory.

16. The encrypting/decrypting accelerator of claim 13 wherein said finite state machine comprises a second input to receive a load signal carrying information and instructions related to the modes to be stored in the memory.

17. The encrypting/decrypting accelerator of claim 16 wherein the finite state machine and the memory are connected to each other by a plurality of electrical lines; the finite state machine is suitable to send on said lines a write enable signal and a write value signal in order to store the received instructions related to the modes into selected locations of the memory.

18. The encrypting/decrypting accelerator of claim 17 wherein the finite state machine is suitable to send on said electrical lines address signals in order to select memory locations of the memory and to receive a replay signal indicative of content of the selected memory locations.

19. The encrypting/decrypting accelerator of claim 13 wherein said logic circuit further comprises:

a first terminal structured to receive a first group of data from the finite state machine, said first group of data allowing the encryption/decryption operations to start according to different modes; and a second terminal structured to send a second group of data to the finite state machine, the second group of data allowing the finite state machine to control the correctness of said performed encryption/decryption operations.

20. The encrypting/decrypting accelerator of claim 7 wherein said logic circuit further comprises an input buffer block coupling the input for input data to be encrypted/decrypted to the arithmetic logic unit and an output buffer block coupling the arithmetic logic unit to the output for encrypted/decrypted data.

21. A method, comprising:

providing a logic circuit coupled to an input, an arithmetic logic unit, and an output;

under direction of a finite state machine, encrypting/decrypting digital data in an encryption/decryption accelerator, the encrypting/decrypting including:

receiving input data to be encrypted/decrypted in the input of said accelerator;

receiving first and second command signals:

defining a plurality of encryption/decryption paths for passing input data through the logic circuit via the application of the first and second command signals to multiplexer circuitry, a first encryption/decryption path through the logic circuit defined according to the first command signals and a second encryption/decryption path through the logic circuit defined according to the second command signals;

performing selectable arithmetic and logic operations on data obtained from said input data by an arithmetic logic unit of the accelerator coupled to said input;

providing an output for encrypted/decrypted data coupled to said arithmetic logic unit;

storing in a memory of the accelerator computer programs, each computer program representative of a corresponding encryption/decryption mode of operation, each computer program including instructions to select corresponding operations performed by the arithmetic logic unit; and periodically storing at least a further computer program in said memory after the encryption/decryption accelerator is in operation, the further computer program received from outside the encryption/decryption accelerator.

22. The method of claim 21, further comprising, executing a encryption/decryption algorithm on input data using a block cipher in the logic circuit along said encryption/decryption path.

23. The method of claim 21, comprising:

providing at least a register bank in said logic circuit for storing bit words obtained from said input data; and providing a least a multiplexer for selectively coupling a plurality of input lines to an output line.

24. An encoding/decoding apparatus, comprising:

a central processing unit; and an encryption/decryption accelerator coupled to the central processing unit and including:

a finite state machine configured to direct operations of the encrypting/decrypting accelerator;

an input for input data to be encrypted or decrypted;

an arithmetic logic unit coupled to said input for performing selectable operations on data obtained from said input data;

an output coupled to said arithmetic logic unit to pass encrypted or decrypted data;

a memory to store a plurality of computer programs, each computer program representative of a corresponding encryption or decryption mode of operation, each computer program including instructions to direct operations to be performed by the arithmetic logic unit, said memory configurable to store a further computer program relating to a different mode of operation, the further computer program receivable from outside the accelerator; and a logic circuit coupling the input, the arithmetic logic unit, and the output, said logic circuit defining encryption/decryption paths for said input data, said logic circuit including multiplexer circuitry, said logic circuit including a first terminal to receive first command signals from the finite state machine to define a first encryption/decryption path through the multiplexer circuitry and second command signals from the finite state machine to define a second encryption/decryption path through the multiplexer circuitry, the first encryption/decryption path corresponding to a first mode of operation and the second encryption/decryption path corresponding to a different second mode of operation.

* * * * *